(12) United States Patent
Duran et al.

(10) Patent No.: US 11,275,793 B2
(45) Date of Patent: Mar. 15, 2022

(54) DEVICE RECOMMENDATIONS BASED ON DEVICE INTERACTIONS IN NETWORK

(71) Applicant: KYNDRYL, INC., New York, NY (US)

(72) Inventors: Edgar Adolfo Zamora Duran, Heredia (CR); Radha Radha Mohan De, Howrah (IN); Luis Carlos Cruz Huertas, San Pedro (CR); Roxana Monge Nunez, San Pedro (CR); Barun Das, Midnapore (IN)

(73) Assignee: KYNDRYL, INC., New York, NY (US)

( * ) Notice: Subject to any disclaimer, the term of this patent is extended or adjusted under 35 U.S.C. 154(b) by 384 days.

(21) Appl. No.: 16/460,855

(22) Filed: Jul. 2, 2019

(65) Prior Publication Data

US 2021/0004409 A1    Jan. 7, 2021

(51) Int. Cl.
*G06F 15/16* (2006.01)
*G06F 9/54* (2006.01)
(Continued)

(52) U.S. Cl.
CPC ....... *G06F 16/908* (2019.01); *G05B 23/0283* (2013.01); *G06F 9/5044* (2013.01); *G06F 11/3051* (2013.01); *G06F 16/906* (2019.01); *G06F 16/9538* (2019.01); *G16Y 40/40* (2020.01); *H04L 67/12* (2013.01); *H04L 67/306* (2013.01); *G06F 11/3058* (2013.01)

(58) Field of Classification Search
CPC ....... H04L 67/12; H04L 67/306; G16Y 40/40; G06F 9/5044; G06F 11/3051; G06F 11/3058

USPC ......................................................... 709/223
See application file for complete search history.

(56) References Cited

U.S. PATENT DOCUMENTS 10,185,934 B2    1/2019  Gupta
10,887,306 B2 *  1/2021  Gupta ................... H04W 12/08
(Continued)

OTHER PUBLICATIONS

Mahalal, "Social Internet of Things: Apps by and for the Crowd", Information Technology for European Advancement, Nov. 2015, 3 pgs.

*Primary Examiner* — Hamza N Algibhah
(74) *Attorney, Agent, or Firm* — Erik Swanson; Andrew M. Calderon; Roberts Calderon Safran & Cole P.C.

(57) ABSTRACT

The disclosure describes techniques for generating device recommendations. The techniques include registering a plurality of Internet of Things (IoT) devices in a social IoT network, where each device performs one or more tasks and the one or more tasks include a first task. The techniques include periodically receiving, with the social IoT network, a work profile from one or more of the registered devices. The work profile includes device information associated with the one or more device tasks performed by the respective registered device. The techniques include grouping devices performing the first task into groups of similar devices, identifying, based on the device information in the work profile received from one or more of the registered devices, at least one device from the group of devices for which recommendations are to be provided, generating the recommendations for the identified device, and providing the recommendations for the identified device.

20 Claims, 6 Drawing Sheets

(51) Int. Cl.
*H04L 29/06* (2006.01)
*G06F 16/908* (2019.01)
*G06F 16/9538* (2019.01)
*G06F 16/906* (2019.01)
*G05B 23/02* (2006.01)
*G06F 9/50* (2006.01)
*H04L 67/12* (2022.01)
*H04L 67/306* (2022.01)
*G06F 11/30* (2006.01)
*G16Y 40/40* (2020.01)

(56) References Cited

U.S. PATENT DOCUMENTS

| | | | |
|---|---|---|---|
| 11,102,122 B2* | 8/2021 | Seed | H04L 47/10 |
| 11,171,939 B1* | 11/2021 | Blank | H04L 63/08 |
| 2014/0164519 A1* | 6/2014 | Shah | H04L 67/02 |
| | | | 709/204 |
| 2014/0244768 A1* | 8/2014 | Shuman | H04W 4/70 |
| | | | 709/206 |
| 2015/0281393 A1* | 10/2015 | Sng | H04L 67/22 |
| | | | 709/204 |
| 2016/0337444 A1* | 11/2016 | Cameron | A24F 40/65 |
| 2016/0342906 A1* | 11/2016 | Shaashua | H04L 67/12 |
| 2017/0262923 A1 | 9/2017 | Bute et al. | |

* cited by examiner

DEVICE RECOMMENDATIONS BASED ON DEVICE INTERACTIONS IN NETWORK

BACKGROUND

In the Internet of Things (IoT), multiple appliances, devices or machinery are contained within a single environment. Each ecosystem is consistently changing. For example, families increase and decrease in size. Companies grow and shrink their work force. In this scenario people and organizations seek to improve efficiency (costs) and comfort in their use of resources.

SUMMARY

In one example, the disclosure describes a method for generating device recommendations, the method comprising registering a plurality of Internet of Things (IoT) devices in a social IoT network, wherein each device performs one or more tasks, wherein the one or more tasks include a first task, periodically receiving, with the social IoT network, a work profile from one or more of the registered devices, wherein the work profile received from one or more of the registered devices includes device information associated with the one or more device tasks performed by the respective registered device, grouping devices performing the first task into groups of similar devices, identifying, based on the device information in the work profile received from one or more of the registered devices, at least one device from the group of devices for which recommendations are to be provided, generating the recommendations for the identified device, and providing the recommendations for the identified device In one example, the disclosure describes a system, comprising a social Internet of Things (IoT) network configure to register a plurality of IoT devices connected as, wherein each device performs one or more tasks, wherein the one or more tasks include a first task, an IoT feed analyzer, and an alert generator, wherein the social IoT network is configured to receive a work profile periodically from one or more of the registered devices, wherein the work profile received from one or more of the registered devices includes device information associated with the one or more device tasks performed by the respective registered devices, wherein the IoT feed analyzer is configured to group devices performing the first task into groups of similar devices, identify, based on the device information in the work profile received from one or more of the registered devices, at least one device from the group of devices for which recommendations are to be provided, and generate the recommendations for the identified device, and wherein the alert generator is configured to transmit the recommendations for the identified device.

In one example, the disclosure describes a computer-readable medium having instructions stored thereon, wherein the instructions, when executed by one or more processors cause the one or more processors to register a plurality of Internet of Things (IoT) devices in a social IoT network, wherein each device performs one or more tasks, wherein the one or more tasks include a first task, periodically receive a work profile from one or more of the registered devices, wherein the work profile received from one or more of the registered devices includes device information associated with the one or more device tasks performed by the respective registered device, group devices performing the first task into groups of similar devices, identify, based on the device information in the work profile received from one or more of the registered devices, at least one device from the group of devices for which recommendations are to be provided, generate the recommendations for the identified device, and provide the recommendations for the identified device.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
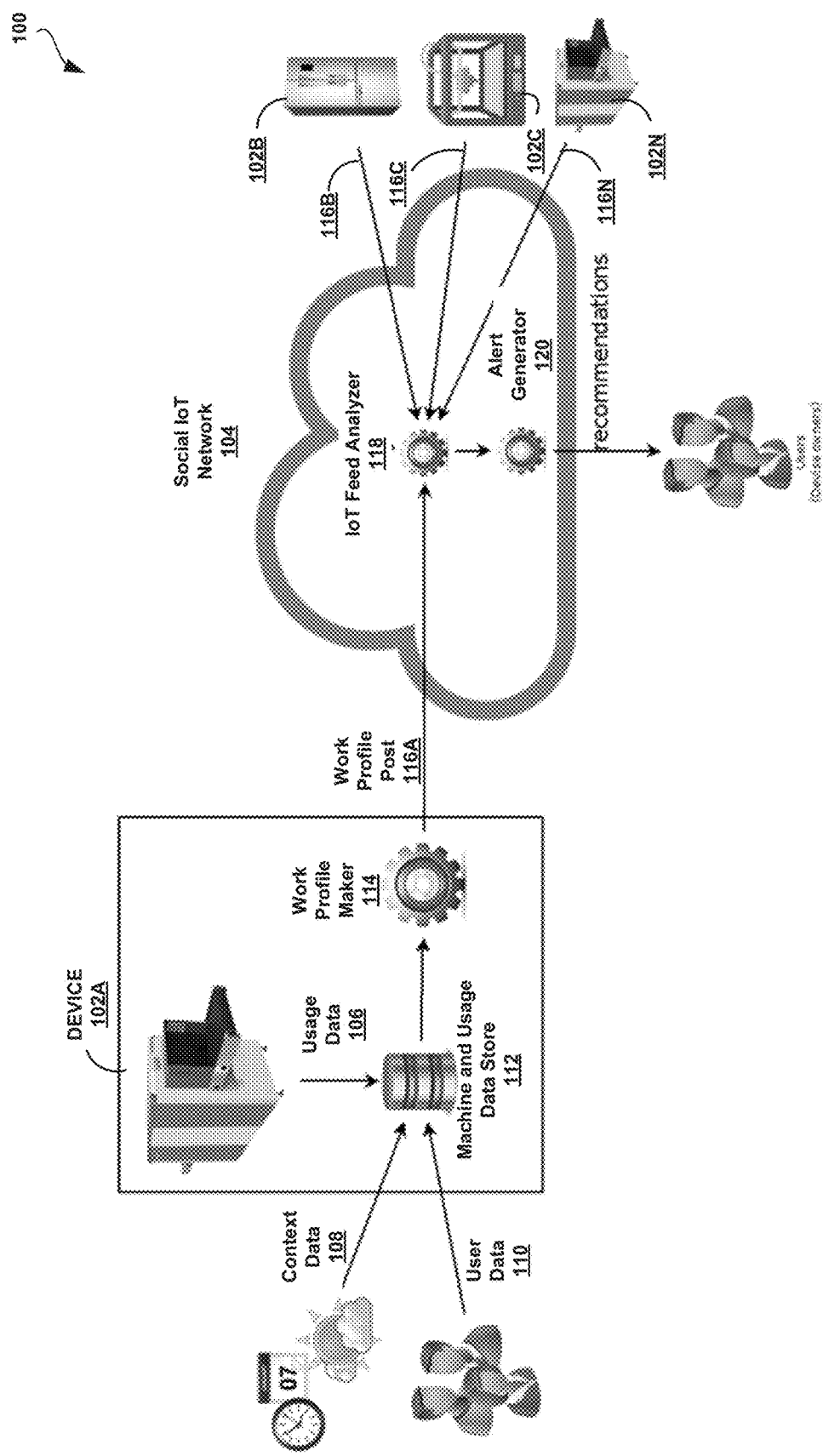
FIG. 1 is a block diagram illustrating an example system configured to perform one or more techniques described in this disclosure.

Social IoT (SIoT) is a recent paradigm within IoT. SIoT enables smart objects to connect among themselves, providing a platform for worldwide interconnected objects to establish so-called "social relationships." In the context of devices forming "social relationships," in a SIoT, rather than information being traded within devices that are co-located, device information is gathered from disparate locations for analysis. For example, in SIoT, individual IoT devices offer or request services and collaborate (e.g., share data) to provide higher quality services for the owner of the devices. In some approaches, devices are able to participate in social networks through the Internet, with different kinds of relationship among objects: co-location, co-work, parental, social or co-ownership.

SIoT creates an opportunity for devices to interact in a way that allows each device to learn from other devices. In the same way a person looks for or provides recommendations in her or his social networks to better accomplish a task, devices can request and receive similar types of recommendations, using the data they gather and without human interaction, so the device owners only have to decide on whether accepting it or not.

In general, this disclosure describes systems and methods for generating recommendations for a device owner. The recommendation may be to replace a particular device, to change the device configuration or to change the working environment of the device, in order to optimize one or more aspects of the tasks the device accomplishes. In one or more examples, the device continuously creates a profile with data about its functioning (usage, resources used, configurations and sensed environment) and posts the profile to its Social IoT network.

The SIoT network may be one or more computing devices that perform operations described in this disclosure for the SIoT network. In some examples, the one or more computing devices provide a cloud-computing environment and the SIoT network operates in the cloud-computing environment. However, the example techniques described in this disclosure are not so limited. One or more local servers may be configured to host the SIoT network. In some examples, there may be a single computing device to host the SIoT network rather than a plurality of computing devices.

As described in this disclosure, the SIoT network may register a plurality of IoT devices. For instance, the SIoT network may connect (e.g., create a communication path) with the plurality of IoT such that the plurality of IoT devices can transmit and receive data and instructions to and from the SIoT. The SIoT periodically receives a work profile from one or more of the registered devices. The work profile received from one or more of the registered devices includes device information associated with one or more device tasks performed by the respective registered device. For instance, the plurality of devices may be configured to generate a work profile that indicates the operation and usage of the respective devices, including information such as where the device failed to operate correctly or failed to operate as intended (e.g., coffee maker did not heat sufficiently, refrigerator consumed more electricity, etc.).

The SIoT network may group devices performing similar tasks. For instance, SIoT network may group all coffee makers into a group, group all refrigerators into a group, and so forth. The SIoT network may provide further granularity in the grouping (e.g., coffee makers of a particular type are a sub-group of the coffee makers group). The SIoT may identify, based on the device information in the work profile received from one or more of the registered devices, at least one device for which recommendations are to be provided. For example, at least one of the devices may be operating in error or in accordance with design but not as desired (e.g., washing machine is operating as designed but is incapable of washing the size of load the owner is putting into the washing machine). The SIoT network may provide the recommendations for the identified device (e.g., replace, change configuration, change working environment, etc.). For example, recommendations are created by the SIoT network that analyzes the data posted and matches other devices of the same type that do a similar or greater amount of work, at a lower cost, in a similar environment.

In techniques described in this disclosure, devices request and receive recommendations using the Social IoT network. The recommendations may be, for example, recommendations for better accomplishing a task. The device may request and receive the recommendations based on the data that each device gathers and without human interaction, and the recommendations are then forwarded to the device owners, so the device owners only have to decide on whether to accept the recommendation or not.

FIG. 1 is a block diagram illustrating an example system configured to perform one or more techniques described in this disclosure. In the example approach of FIG. 1, system 100 includes devices 102A-102N (collectively, devices 102) connected to Social IoT (SIoT) network 104. In one or more examples, SIoT network 104 is a cloud computing system. However, the example techniques described in this disclosure are not so limited.

As described in more detail, system 100 may generate recommendations for device owners to replace devices 102, change the device configurations of devices 102, or change the working environment of devices 102, in order to optimize one or more aspects of the tasks device 102 are to accomplish. As described in more detail, devices 102 may create work profile posts (like work profile posts 116A-116N) with data about the functioning (usage, resources used, configurations and sensed environment) of devices 102. SIoT network 104 is configured to periodically receive work profile posts 116 and generate the recommendation (e.g., via IoT feed analyzer 118). For instance, IoT feed analyzer 118 analyzes the work profile posts 116 posted and matches another devices of the same type that do a similar or major amount of work, at a lower cost, in a similar environment.

Devices 102 may be various types of household devices such as appliances, printers, televisions, thermostats, and the like. Devices 102 may be connected to a network like the Internet. For example, within a home or office setting, there are one or more routers that are connected to a network provided by an Internet service provider (ISP). Each of devices 102 may have their own unique address and transmit and receive data using their unique address. There may be other ways in which devices 102 are connected to a network, like the Internet and the example techniques should not be considered limited to any particular way in which devices 102 connect to a network.

As illustrated, SIoT network 104 includes IoT feed analyzer 118 and alert generator 120. In one or more examples, feed analyzer 118 and alert generator 120 may be software executing on a computing device of SIoT network 104. In some examples, feed analyzer 118 and alert generator 120 may be fixed-function circuitry.

Each device 102 gathers information on its usage, its costs of operation and the environment in which it operates. For example, device 102A includes a controller and memory. The controller is configured to monitor information of the usage of device 102A and stores the information in memory of device 102A. For instance, as described in more detail below, the controller may determine usage data 106 and store the usage data in machine and usage data store 112. For ease of illustration, in the example of FIG. 1, device 102A is a printer and usage data 106 and machine and usage data store 112 are shown as external to device 102A. However, in some examples, usage data 106 and machine and usage data store 112 may be internal to device 102A (e.g., the controller of device 102A gathers usage data 106 and device 102A includes memory, which is an example of usage data store 112).

In some examples, device 102A executes work profile maker 114. For instance, work profile maker 114 may be software executing on the controller for device 102A. In some examples, it may be possible for work profile maker 114 to execute on a device external to device 102A. For example, a technician may bring his or her laptop over to an owner's premises and interface with device 102A (e.g., via a USB or Ethernet port). The laptop downloads usage data 106 from machine and usage data store 112. The laptop may then execute work profile maker 114 to generate a work profile. In such examples, the laptop and device 102A may be together considered as an SIoT device since the laptop and device 102A together connect to SIoT network 104.

In one example approach, each device 102 (also called smart devices or IoT devices) subscribes to SIoT network 104 and posts its device work profile as a post to SIoT network 104. Together, devices 102 act as a set of smart objects able to gather such usage, cost and environment data in a device work profile that is posted to SIoT network 104 and analyzed by one or more IoT feed analyzers 118.

As described above, in the example shown in FIG. 1, each device 102 includes a machine and usage data store 112 and, in some examples, work profile maker 114. In some example approaches, device 102 captures information on its usage (usage data 106), its environment (context data 108) and its users (user data 110) and stores the information in a machine and usage data store 112. Work profile maker 114 formats some or all of the stored information in a work profile post 116A and posts work profile post 116A to SIoT network 104.

Work profile post 116A includes one or more of information about the usage, environment, and users. As an example, work profile post 116A includes device identification, device type information, owner identification, and manufacturer identification. Work profile post 116A may also include information such as times when device 102A generated errors, types of errors, number of errors, etc. Work profile post 116A may also include information such as when device 102A operated out of specification. In some examples, work profile post 116A includes information indicative of power usage, temperature, humidity, and other environmental conditions. For instance, usage data 106 may include one or more of the above example usage data, and work profile maker 114 may parse through usage data 106 to generate work profile post 116A. The above examples of usage data 106 is provided to assist with understanding and should not be considered limiting. In some examples, work profile post 116A is a text file formatted in a particular manner that allows IoT feed analyzer 118 to parse the information of work profile post 116A. However, the techniques described in this disclosure are not so limited.

Work profile post 116A may be considered a standard or base profile for device 102A that contains performance index for device 102A. As described in more detail, IoT feed analyzer 118 may utilize the performance index for device 102A as a threshold value to determine whether any recommendations for repairing or replacing device 102A. As illustrated, devices 102B-102N may similarly generate respective work profile posts 116B-116N.

In one example approach, SIoT network 104 registers devices 102. Registering devices 102 may refer to providing devices 102 access to IoT feed analyzer 118 and alert generator 120 and generally provide a hub through which devices 102 can access information about other devices, especially those that are not co-located with devices 102 in the same premises. In some examples, registering devices 102 also refers to examples where SIoT network 104 provides devices 102 with additional computing and storage resources that are unavailable locally at devices 102.

Each device 102 performs one or more tasks and periodically posts respective work profiles 116 to SIoT network 104. Each work profile post 116 includes performance metrics associated with the one or more tasks performed by respective devices 102. SIoT network 104 includes memory to store work profiles 116 that IoT feed analyzer 118 receives and compares the work profile posts 116 of similar devices to identify, based on the performance metrics in the work profile of each device, device tasks where performance can be improved. IoT feed analyzers 118 then provide recommendations of the identified devices for improving performance of the identified device tasks including by recommending replacement of the device.

Accordingly, FIG. 1 illustrates examples where devices 102 create respective work profile posts 116 via respective work profile makers 114. Work profile posts 116 include usage data, users data, configuration data, and environment data, as a few examples. Work profile makers 114 post respective work profile posts 116 in SIoT network 104. SIoT network 104, in turn, compares work profile posts 116 of different devices 102 (e.g., via IoT feed analyzer 118) to determine device replacements, configuration or environment changes that improve costs in the tasks and/or user's comfort.

The example techniques described in this disclosure may provide one or more advantages, particularly ones that provide a practical application to solve technical problems. For instance, some existing techniques that provide device recommendations may be insufficient without access to a social network like SIoT network 104, such as in examples where IoT feed analyzer 118 performs comparisons with other devices. The example techniques described in this disclosure provide for a manner in which operational information from different devices is gathered allowing IoT feed analyzer 118 to intelligently determine whether a particular device is operating sub-optimally. Moreover, by gathering information of different devices, IoT feed analyzer 118 may be configured to determine whether another type of device is better suited for tasks being performed by devices 102.

IoT feed analyzer 118 provides for a centralized computing process whereby usage data can be gathered from many different devices 102. IoT feed analyzer 118 can compare the usage information to determine whether devices 102 are operating out of specification or poorly, which is information that may not be available in some other techniques that provide device recommendations. Based on the comparison, IoT feed analyzer 118 can determine a recommendation for the device.

For instance, FIG. 1 illustrates examples by which devices 102 create work profile posts 116 containing usage data, users data, configuration data and environments data, and posts in a SIoT network 104. FIG. 1 also illustrates examples by which IoT feed analyzer 118 intelligently compares a device of devices 102 to other devices 102 using the work profile posts 116 posted to determine devices replacements, configurations or environment changes that improve costs in the tasks and/or users comfort.

Alert generator 120 receives the recommendation from IoT feed analyzer 118 and provides the recommendation to the device. In FIG. 1, alert generator 120 is shown as providing the recommendation to the users. There may be various ways in which alert generator 120 may provide the recommendation to the users. As one example, alert generator 120 outputs the recommendation back to devices 102 that then display the recommendation to the users. As another example, alert generator 120 outputs the recommendation to an application executing on a smart phone or tablet of the user and the phone or table informs the users. As another example, alert generator 120 outputs an electronic mail (e-mail) that the users receive that includes the recommendation.

Although the operations of alert generator 120 and IoT feed analyzer 118 are described separately, it should be understood that this disclosure contemplates examples where alert generator 120 and IoT feed analyzer 118 are highly integrated. Hence, the description of alert generator 120 and IoT feed analyzer 118 should be understood as a way in which to conceptually differentiate the operations. In implementation, alert generator 120 and IoT feed analyzer 118 may be integrated or may be separate modules. In some examples, SIoT network 104 may include another component that performs some of the functions ascribed to IoT feed analyzer 118 and alert generator 120.

Using the example techniques described in this disclosure devices 102 can provide on time alert to its owner to keep its working environment optimized for best performance based on recommendation received from alert generator 120. Devices 102 can collect more optimized way of performing a standard work with more modern and up-to-date devices/appliances using SIoT network 104. Also, owners (e.g., users) of IoT enabled devices 102 can receive alert at the right time to replace their device at the right time with new one.

In one example approach, IoT feed analyzer 118 collects performance metrics of devices and appliances connected into SIoT 104 from their posted work profiles 116 and generates a machine-learning model that is used to identify whether the performance of the device or appliance is below a benchmark threshold. As one example, machine-learning (ML) model may be built for each standard devices 102, which are IoT powered, with their standard configuration information and performance measure. During course of time, as more and more device profile and work profile come into the techniques described in this disclosure, it enriches the ML model. The ML technique may be considered as behaving like help desk assistance that suggests and recommends configuration adjustment for underperforming devices 102 based on its ML based training system. In some examples, continuous learning technique sharpens the accuracy of the model and yields better answer for queries as more and more device 102 issues and complaints are addressed using the example techniques described in this disclosure.

There may be various examples of machine-learning techniques including linear regression algorithm and non-linear regression algorithms. The techniques may be applied to a dataset having multiple parameters (e.g., 5 parameters), each parameter describing a dimension of a part of a flower. In some examples, linear aggression based ML may operate better than other ML techniques.

IoT feed analyzer 118 may also determine reasons behind poor performance of the device or appliance under a controlled environment (e.g., be it due to overwork or to an increase in the number of users such as due to an increase in family members). Such information is available from work profile posts 116 in one or more examples.

In some example approaches, IoT analyzer 118 (e.g., hardware circuits including fixed-function and/or programmable circuitry or software executing on the programmable circuitry) is configured to match device work profile posts 116 to the work profile posts 116 of other devices 102 in order to generate different of recommendations. The recommendations may range from recommending that the device owner replace the device, to recommending changes in the device configuration, to recommending changes in the environment in which the device operates.

FIG. 1 also illustrates alert generator 120. Alert generator 120 may be configured to receive information indicative of reasons of poor performance of devices 102 under controlled environment and output recommendation (e.g., notify its owner to take necessary actions). Examples of the action include, but are not limited to, buying a new device/appliance to optimize performance for a profiled work with standard expected performance. For example, a damaged and exhausted device/appliance can be replaced with a new one. Another example of the action may be a recommendation to buy a modern and up-to-date device/appliance to optimize performance of a profiled work. For example, a printer-scanner can replace a separate printer and separate scanner. Another example of the action may be a recommendation to take a device/appliance in rent to execute a work with expected performance, which existing device/appliance cannot help to execute. For example, in an event at home, a more powerful device/appliance may be needed.

The following provide one or more examples for implementing one or more of techniques described in this disclosure. As one example, a smart 3D printer pattern of usage has changed to reach out of specification values and features, this is included in the profile post 116A in SIoT network 104, where a smart agent (e.g., IoT feed analyzer 118 and/or alert generator 120) matches other smart 3D printers that do a similar work amount and type. The agent (e.g., IoT feed analyzer 118 and/or alert generator 120) post some replacement and/or components plug-ins recommendations to the 3D printer, which it shows to the user.

As another example, a scanner with manual sheet feed post its data (amount and characteristics of its work) in SIoT network 104. The smart agent (e.g., IoT feed analyzer 118 and/or alert generator 120) identifies an ink-injection printer of the same owner and location posting an increase it is work. The smart agent (e.g., IoT feed analyzer 118 and/or alert generator 120) is able to send recommendations for laser printer with scanner kit that is less ink consuming and support larger workloads.

As another example, a coffee maker consumes more electricity to complete coffee making, since number of family members increased in a home and coffee maker cannot complete the required volume of coffee in a single shot. At the same time, it follows a member of a social contact is has fewer number of family members for whom this coffee maker is perfect. IoT feed analyzer 118 and/or alert generator 120 may recommend auctioning of the coffee maker to a needier one and recommend an induction device for helping making coffee in a single shot.

In this manner, SIoT network 104 may be configured to register a plurality of Internet of Things (IoT) devices 102 in social IoT network 104. Each one of devices 102 performs one or more tasks (e.g., a first task). Social IoT network 104 may be configured to periodically receive a work profile (e.g., work profile post 116A) from one or more of the registered devices 102 The work profile (e.g., work profile post 116) received from one or more of the registered devices 102 includes device information associated with the one or more device tasks performed by the respective registered device 102.

As described above, the device information includes usage information. In some examples, the device information includes one or more of a device identifier, a device model identifier, a device type, an owner identifier and a manufacturer identifier. In some examples, the usage information includes one or more of date information, device status information, and resource consumption. In some examples, the resource consumption usage information includes one or more of electricity consumption and consumables consumption. The device information may also include one or more of device size and device environmental conditions.

IoT feed analyzer 118 may be configured to group devices 102 performing the first task into groups of similar devices. For instance, IoT feed analyzer 118 may determine which devices 102 are similar to device 102A and provide capabilities that would be desirable for the user of device 102A.

IoT feed analyzer 118 may identify, based on the device information in the work profile (e.g., work profile post 116A) received from one or more of the registered devices 102, at least one device of devices 102 for which recommendations are to be provided. IoT feed analyzer 118 may utilize the work profile posts 116 to determine a threshold level of performance. For instance, IoT feed analyzer 118 may compare performance of the first task for each group of similar devices 102 to determine a median or average performance level. As another example, IoT feed analyzer 118 may utilize linear regression to determine a baseline level of minimum performance that each one of devices 102 that are in a group of similar devices should provide. Based on this baseline level or the median or average level, IoT feed analyzer 118 may determine a threshold level of performance.

In one example, IoT feed analyzer 118 may select as the identified device of devices 102 and based on the device information in the work profile (e.g., work profile posts 116) posted by each registered device 102, the at least one device of devices 102 that is performing the first task at or below the threshold level of performance for their group. In one example, IoT feed analyzer 118 may also determine devices 102 that are operating above the threshold level of performance so that alert generator 120 can output information of the devices 102 that are operating above the threshold level, allowing the user to determine whether to upgrade from the current device.

Alert generator 120 may be configured to provide the recommendations for the identified device. As one example, alert generator 120 provides the recommendations that includes a replace recommendation. As one example, alert generator 120 provides the recommendations that includes consulting a user profile associated with the owner of the respective device to determine whether replacement is warranted and, if warranted, providing a replace recommendation. As one example, alert generator 120 provides the recommendations that includes providing a configuration recommendation. As one example, alert generator 120 provides the recommendations that includes determining environmental changes appropriate for the identified device and providing an environmental recommendation (e.g., change in heat, humidity, location in premises, etc.). Alert generator 120 may provide recommendations that include one or more of the above examples of recommendations.

In some examples, IoT feed analyzer 118 may identify the at least one device for which recommendations are to be provided by determining, based on the device information in the work profile posted by each registered device, whether a different device would better meet the device owner's needs. In these examples, alert generator 120 may provide recommendations including providing a replace recommendation identifying one or more devices that better meet the device owner's needs.

In some examples, IoT feed analyzer 118 may identify the at least one device for which recommendations are to be provided by determining, based on a user profile and on the device information in the work profile posted by each registered device, whether a different device would better meet the device owner's needs. In such examples, alert generator 120 may provide recommendations including providing a replace recommendation identifying one or more devices that better meet the device owner's needs.

In this manner, IoT feed analyzer 118 periodically receives work profile posts 116 and is able to determine which ones of devices 102 are behaving in a manner where a recommendation would be useful to the user. For instance, IoT feed analyzer 118 may generate baseline or average performance levels (as two examples) each time work profile posts 116 are received. As one example, IoT feed analyzer 118 may group devices performing that each perform a task (e.g., a first task of one or more tasks) into groups of similar devices, and determine a threshold level of performance (e.g., baseline or average performance levels).

IoT feed analyzer 118 may identify at least one device for which recommendations are to be provided. Here, the at least one device for which recommendations are to be provided is not limited to the example where the device receives the recommendation (although that is possible) but means at least one device for which a recommendation is to be generated. For instance, IoT feed analyzer 118 may determine which device is operating below the threshold performance level. As another example, IoT feed analyzer 118 may determine that there are devices that are performing better than a particular device, and may determine that recommendations should be generated for this particular device (e.g., information about the devices that are performing better).

The following are additional examples of techniques in accordance with the disclosure for a 3D printer. An exemplary post (e.g., work profile post 116) to SIoT network 104 is:

```
{
    "deviceId": "1q2s-3d4f-5g6h",
    "deviceType": "3D Printer",
    "ownerId": "z1x2-x3c4-v5b6",
    "manufacturerId": "0m9n-8b7v-6c54",
    "usage": [
        {
            "datetime": "2018-09-23",
            "status": "executed-using-defaults-for-outOfSpecs",
            "electricityConsumption": "3 wats",
            "modelCharacteristics": {
                "size": {
                    "length": 20,
                    "width": 20,
                    "height": 25
                },
                "colors": [
                    "#0000ff",
                    "#000000",
                    "#ffffff"
                ],
                "complexityLevel": "high"
            },
            "outOfSpecs": {
                "multipleColorSource": true,
                "size": true
            },
            "time": "00:50:00"
        }
    ],
    "configurations": {
        "size": {
            "length": 70,
            "width": 60,
            "height": 65
        }
    },
    "environment": {
        "temperature": 54,
        "humidity": 34
    }
}
```

IoT Feed Analyzer 118 would then been able to do analysis as follows: 3D printers that do same work, with less electricity consumption, but has different environments set-ups, 3D printers that do similar jobs with no outOfSpecs flags, and 3D printers with similar jobs but not "denied" or "executed-using-defaults-for-outOfSpecs" values in the status flags.

The following is an example where IoT feed analyzer 118 determines that the recommendation should be Buy/Replace recommendations:

For Device X0

1. Selects devices for same type than X0, this is X1 . . . Xn

2. Compare posted profiles (X0 vs X1 . . . Xn) for:
   Cost by work
   Usage, work (quantity and characteristics) real vs designed.
   Features
3. Select those devices that perform better than X0 in utilization, features used/unused and cost efficiency, this is Xb1 . . . Xbn
4. Balance the recommendation using owner preferences or defaults about cost and work gain vs cost and characteristics.

The following is an example where IoT feed analyzer 118 determines that the recommendation should be configuration recommendations:
For Device X0
1. Selects Devices for same type and model than X0, this is X1 . . . Xn
2. Compare posted profiles for cost and work (quantity and characteristics), X0 vs X1 . . . Xn
3. Select those devices that perform better than X0 in work and cost, this is Xb1 . . . Xbn
4. Compare posted profiles for configuration differences, X0 vs Xb1 . . . Xbn
5. For each difference in environment query to the knowledge base for the measures to solve it (e.g. X0 does print at colors⇒measure1: set print quality to High to improve definition; measure 2: buy color cartridge feeding module).
6. Balance the recommendation using owner preferences or defaults about cost and work gain vs number, cost and characteristics of changes.

The following is an example where IoT feed analyzer 118 determines that that the recommendation should be environment recommendations:
For Device X0
1. Selects Devices for same type than X0, this is X1 . . . Xn
2. Compare posted profiles for cost and work (quantity and characteristics), X0 vs X1 . . . Xn
3. Select those device that perform better than X0 in work and cost, this is Xb1 . . . Xbn
4. Compare posted profiles for environment differences, X0 vs Xb1 . . . Xbn
5. For each difference in environment query to the knowledge base for the measures to solve it (e.g. X0 room temperature is 6 degrees higher than X1⇒measure: add a cooler to room, type: add new device, cost: 60$ approx).
6. Balance the recommendation using owner preferences or defaults about cost and work gain vs number, cost and characteristics of changes.

In some examples, alert generator 120 may provide recommendations that can be presented according to owner preferences like costs or comfort, or a default, like better job execution. For providing device kits (e.g., devices that go together) recommendations, IoT feed analyzer 118 may use the Owner Id, to merge work profile posts 11 of predefined types of devices (e.g. printers and scanners, washer and dryers). Then, IoT feed analyzer 118 may perform analysis reusing above example techniques. In some examples, devices 102, through work profile maker 114, can optionally gather owner's data about events that could be related to the device, ask questions or gather more related data from the description (e.g. number of people, duration) and create a work profile post 116 if the device specifications are out of the required service capabilities. Then recommendations can be generated by IoT feed analyzer 118 after comparing the work profile post with work of other devices.

Figure 2:
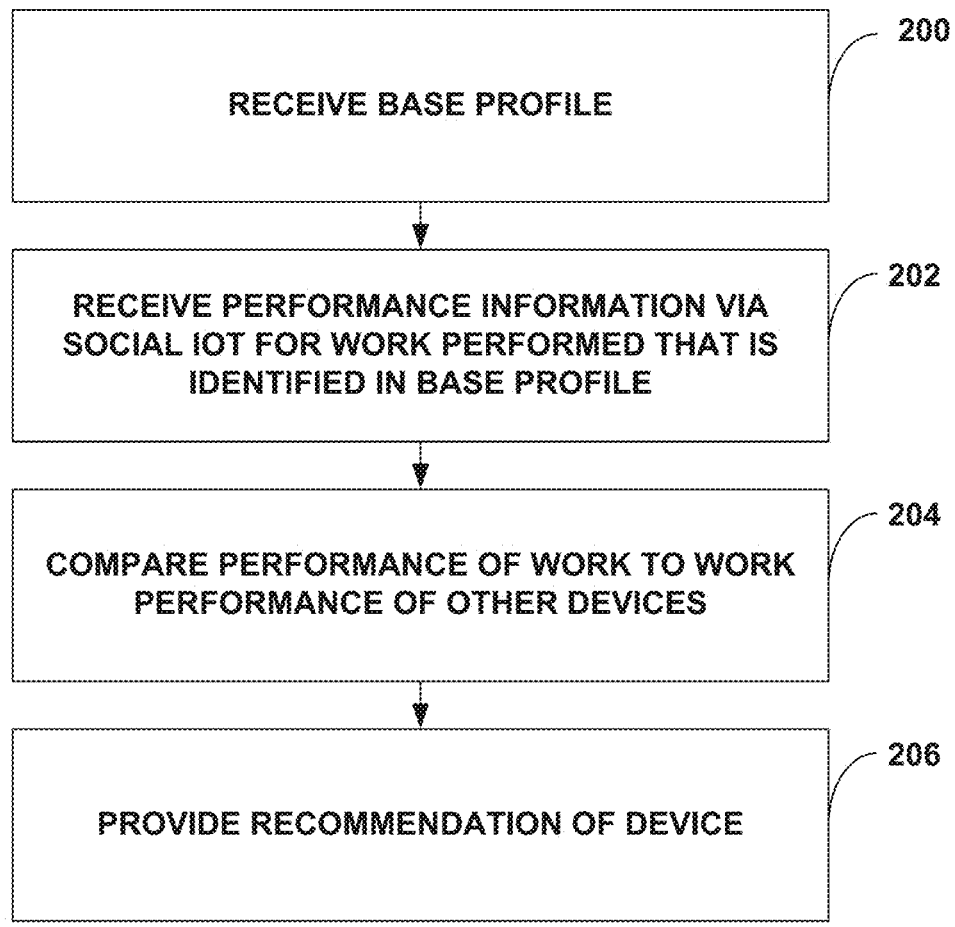
FIG. 2 is a flowchart illustrating an example method of operation in accordance with one or more example techniques described in this disclosure.

FIG. 2 is a flowchart illustrating an example method of operation in accordance with one or more example techniques described in this disclosure. As illustrated in FIG. 2, work profile maker 114 generates a base (e.g., standard) profile (e.g., work profile post 116A) for some frequently done work in household and office environment, which user does using IoT embedded devices and appliances in controlled environment. IoT feed analyzer 1118 receives the base profile (200).

The IoT feed analyzer 118 receives performing information via the social IoT network 104 for work performed that is identified in base profile (202). The IoT feed analyzer 118 compares the performance of the device to work performance of other devices (204). For example, there are regular feed exchanges from IoT devices 102 in Social IoT network 104 that are being followed to compare the performances of those devices 102 to perform some standard works of the base profile (e.g., work profile post 116A).

On the basis of above, alert generator 120 may provide recommendations for the device (206). As one example, alert generator 120 may recommend a modern and better performing devices and appliances to its owner as social network alert, which can execute a work with more effective performance. As another example, alert generator 120 may also alert device and appliance owner to adjust their environment to let the devices perform better when the device finds way of performing better from other devices but needs owner cooperation. As another example, alert generator 120 may also inform user to replace a device and appliance by auctioning it to other owner where it may perform better for its helpful ecosystem, as interpreted from performance information for a standard work as profiled in work profile post 116A. As another example, alert generator 120 may additionally also recommend one or more devices to book for rent to perform some over work than it is profiled in work profile post 116A on certain date.

Figure 3:
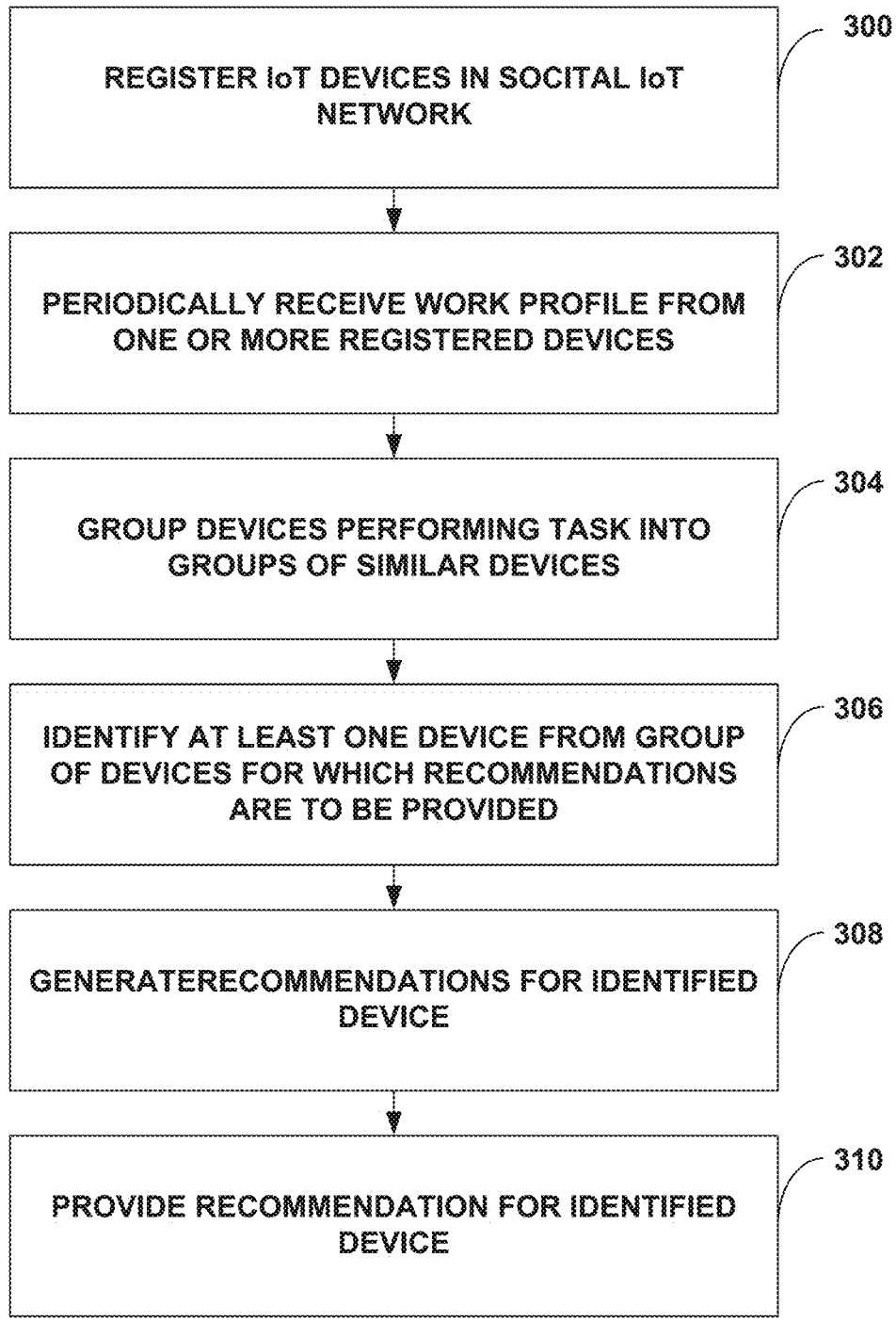
FIG. 3 is another flowchart illustrating an example method of operation in accordance with one or more example techniques described in this disclosure.
Figure 4:
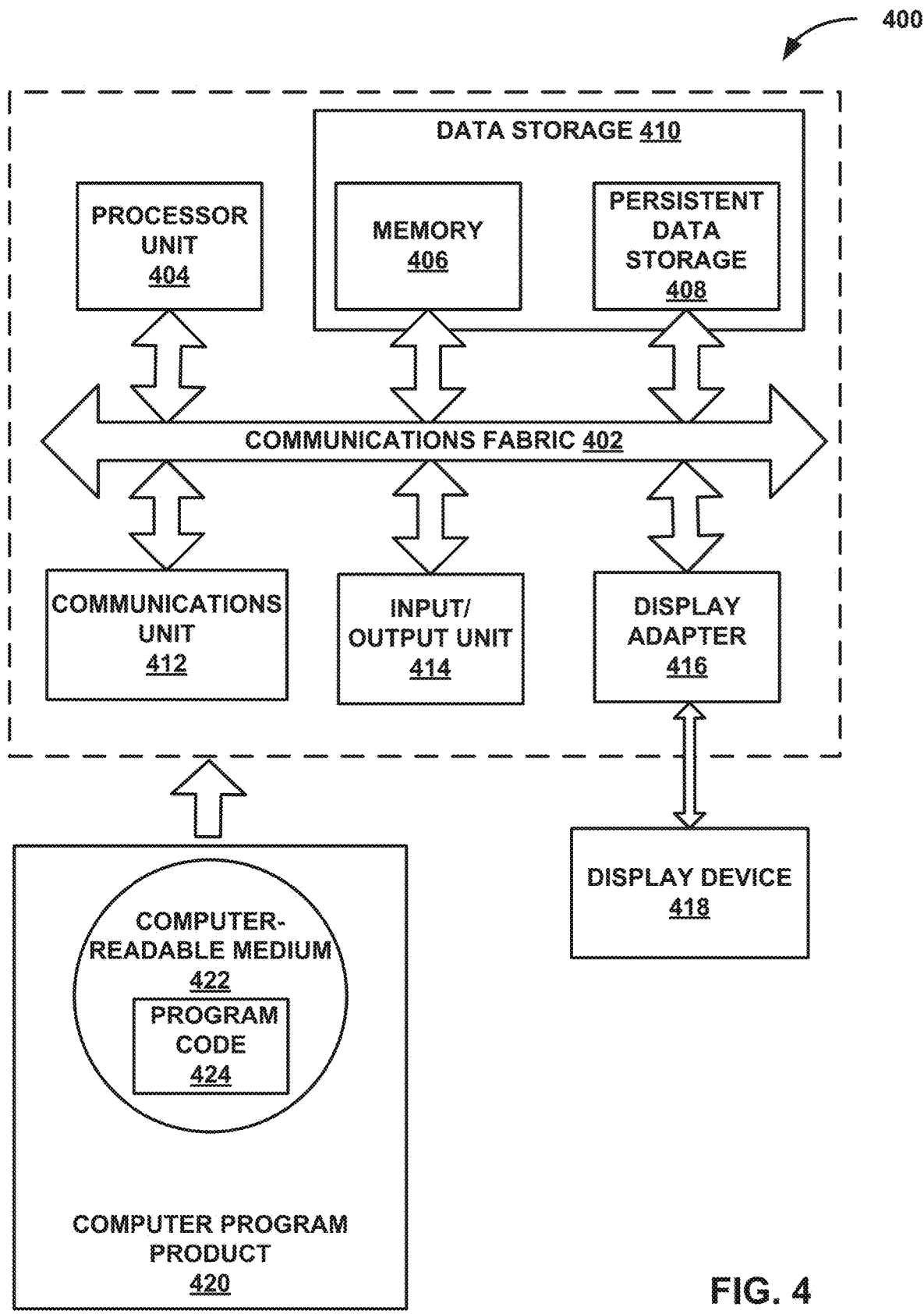
FIG. 4 is a block diagram illustrating an example devices of FIG. 1 in further detail.

FIG. 3 is another flowchart illustrating an example method of operation in accordance with one or more example techniques described in this disclosure. As illustrated in FIG. 3, SIoT network 104 may register IoT devices 102 (300). Each device 102 performs one or more tasks, and the one or more tasks includes a first task (e.g., making coffee, washing dishes, etc.). For example, SIoT network 104 may allow devices 102 access to computing and storage resources of SIoT network 104. SIoT network 104 may perform some initialization and key exchange so that devices 102 able to communicate with SIoT network 104. Also, SIoT network 104 may allocate storage and computing resources to devices 102, possibly on an as-needed basis.

IoT feed analyzer 118 of SIoT network 104 may periodically receive a work profile (e.g., work profile post 116A) from one or more of the registered devices 102 (302). For example, devices 102 may each execute respective ones of work profile makers 114. Work profile makers 114 may utilize device information to generate a file that includes various types of device information that is readable by IoT feed analyzer 118. Examples of the device information includes usage information, device identifier, a device model identifier, a device type, an owner identifier, and a manufacturer identifier, as a few examples. The usage information may include one or more of date information, device status information, and resource consumption. The resource consumption may include electricity consumption and consumables consumption. The device information may also include one or more of device size and device environmental conditions.

IoT feed analyzer 118 may be configured to group devices performing the first task into groups of similar devices (304). For instance, IoT feed analyzer 118 may construct a group that includes devices 102 that are coffee makers of a certain type or are used for a certain function (e.g., suitable for home use versus suitable for commercial use). IoT feed analyzer 118 may construct a group that includes devices 102 of the same manufacturer. Other example ways in which to group devices 102 is possible and the example techniques should not be considered limited to the above examples.

In one or more examples, IoT feed analyzer 118 may identify, based on the device information in the work profile received from one or more of the registered devices 102, at least one device from the group of devices for which recommendations are to be provided (306). For example, IoT feed analyzer 118 may determine a threshold level of performance for the first task for each group of similar devices and select as the identified device and based on the device information in the work profile posted by each registered device, the at least one device that is performing the first task at or below the threshold level of performance for their group. In some example, IoT feed analyzer 118 may select a device from one or more devices in the group that is performing at or above the threshold level of performance for the group. IoT feed analyzer 118 may identify a device that is performing below the threshold level that could be replaced with the device that is performing above the threshold level.

There may be other ways in which IoT feed analyzer 118 may identify at least one device for which recommendations are to be provided. As one example, IoT feed analyzer 118 may determine, based on the device information in the work profile posted by each registered device, whether a different device would better meet the device owner's needs.

IoT feed analyzer 118 may generate the recommendations for the identified device (308). For example, IoT feed analyzer 118 may be determine whether a buy/replace recommendation is the correct recommendation, whether an update to the device configuration is the correct recommendation, or whether change in environment is the correction recommendation, as described above. As additional examples, IoT feed analyzer 118 may determine whether there are comparable devices with fewer errors or devices that are better suited for the intended use.

Alert generator 120 may provide the recommendations for the identified device (310). Alert generator 120 may provide an e-mail, text message, message to application, message to devices 102, as a few example ways in which alert generator 120 may provide the recommendations. Examples of the recommendations include one or more of a replace recommendation, a configuration recommendation and an environmental recommendation. In some examples, alert generator 120 provides recommendations including a replace recommendation identifying one or more devices that better meet the device owner's needs.

FIG. 3 is a block diagram of a device 400, in accordance with an example of this disclosure. Device 400 may be an example of devices 102 as depicted in FIG. 1 or may be an example of a computing device in SIoT network 104. Device 400 may also be any server for providing an enterprise business intelligence application in various examples, including a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind. Other implementations of a device 400 may include a computer having capabilities or formats other than or beyond those described herein.

The following is an example description of device 400. It should be understood that device 400 need not include all of these components. For instance, in examples where device 400 is an example of devices 102, certain devices 102 may not include display adapter 416 and display device 418. Similarly, in examples where device 400 is a server of SIoT network 104, device 400 may not include display adapter or display device 418. Also, the computing resources of processor unit 404 and the storage capabilities of data storage 410 may be different in examples where device 400 is one of devices 102 as compared to examples where device 400 is a computing device in SIoT network 104.

In the illustrative example of FIG. 3, device 400 includes communications fabric 402, which provides communications between processor unit 404, memory 406, persistent data storage 408, communications unit 412, and input/output (I/O) unit 414. Communications fabric 402 may include a dedicated system bus, a general system bus, multiple buses arranged in hierarchical form, any other type of bus, bus network, switch fabric, or other interconnection technology. Communications fabric 402 supports transfer of data, commands, and other information between various subsystems of device 400.

Processor unit 404 may be a programmable central processing unit (CPU) configured for executing programmed instructions stored in memory 406. In another illustrative example, processor unit 404 may be implemented using one or more heterogeneous processor systems in which a main processor is present with secondary processors on a single chip. In yet another illustrative example, processor unit 404 may be a symmetric multi-processor system containing multiple processors of the same type. Processor unit 404 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 404 may include a multi-core processor, such as a dual core or quad core processor, for example. Processor unit 404 may include multiple processing chips on one die, and/or multiple dies on one package or substrate, for example. Processor unit 404 may also include one or more levels of integrated cache memory, for example. In various examples, processor unit 404 may comprise one or more CPUs distributed across one or more locations.

Data storage 410 includes memory 406 and persistent data storage 408, which are in communication with processor unit 404 through communications fabric 402. Memory 406 can include a random access semiconductor memory (RAM) for storing application data, i.e., computer program data, for processing. While memory 406 is depicted conceptually as a single monolithic entity, in various examples, memory 406 may be arranged in a hierarchy of caches and in other memory devices, in a single physical location, or distributed across a plurality of physical systems in various forms. While memory 406 is depicted physically separated from processor unit 404 and other elements of device 400, memory 406 may refer equivalently to any intermediate or cache memory at any location throughout device 400, including cache memory proximate to or integrated with processor unit 404 or individual cores of processor unit 404.

Persistent data storage 408 may include one or more hard disc drives, solid state drives, flash drives, rewritable optical disc drives, magnetic tape drives, or any combination of these or other data storage media. Persistent data storage 408 may store computer-executable instructions or computer-readable program code for an operating system, application files comprising program code, data structures or data files, and any other type of data. These computer-executable instructions may be loaded from persistent data storage 408 into memory 406 to be read and executed by processor unit 404 or other processors. Data storage 410 may also include any other hardware elements capable of storing information, such as, for example and without limitation, data, program code in functional form, and/or other suitable information, either on a temporary basis and/or a permanent basis.

Persistent data storage 408 and memory 406 are examples of physical, tangible, non-transitory computer-readable data storage devices. Data storage 410 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 404 can also be suitably programmed to read, load, and execute computer-executable instructions or computer-readable program code. This program code may be stored on memory 406, persistent data storage 408, or elsewhere in device 400. This program code may also take the form of program code 424 stored on computer-readable medium 422 (e.g., a computer-readable storage medium) comprised in computer program product 420, and may be transferred or communicated, through any of a variety of local or remote means, from computer program product 420 to device 400 to be enabled to be executed by processor unit 404.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 404 can be suitably programmed to read, load, and execute instructions of the operating system.

Communications unit 412, in this example, provides for communications with other computing or communications systems or devices. Communications unit 412 may provide communications through the use of physical and/or wireless communications links. Communications unit 412 may include a network interface card for interfacing with a network, an Ethernet adapter, a Token Ring adapter, a modem for connecting to a transmission system such as a telephone line, or any other type of communication interface. Communications unit 412 can be used for operationally connecting many types of peripheral computing devices to device 400, such as printers, bus adapters, and other computers. Communications unit 412 may be implemented as an expansion card or be built into a motherboard, for example.

The input/output unit 414 can support devices suited for input and output of data with other devices that may be connected to device 400, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 414 may also include any type of interface for video output in any type of video output protocol and any type of monitor or other video display technology, in various examples. It will be understood that some of these examples may overlap with each other, or with example components of communications unit 412 or data storage 410. Input/output unit 414 may also include appropriate device drivers for any type of external device, or such device drivers may reside elsewhere on device 400 as appropriate.

Device 400 also includes a display adapter 416 in this illustrative example, which provides one or more connections for one or more display devices, such as display device 418, which may include any of a variety of types of display devices. It will be understood that some of these examples may overlap with example components of communications unit 412 or input/output unit 414. Input/output unit 414 may also include appropriate device drivers for any type of external device, or such device drivers may reside elsewhere on device 400 as appropriate. Display adapter 416 may include one or more video cards, one or more graphics processing units (GPUs), one or more video-capable connection ports, or any other type of data connector capable of communicating video data, in various examples. Display device 418 may be any kind of video display device, such as a monitor, a television, or a projector, in various examples.

Input/output unit 414 may include a drive, socket, or outlet for receiving computer program product 420, which comprises a computer-readable medium 422 having computer program code 424 stored thereon. For example, computer program product 420 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 422 may include any type of optical, magnetic, or other physical medium that physically encodes program code 424 as a binary series of different physical states in each unit of memory that, when read by device 400, induces a physical signal that is read by processor unit 404 that corresponds to the physical states of the basic data storage elements of computer-readable medium 422, and that induces corresponding changes in the physical state of processor unit 404. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 404, thereby physically causing or configuring processor unit 404 to generate physical outputs that correspond to the computer-executable instructions, in a way that causes device 400 to physically assume new capabilities that it did not have until its physical state was changed by loading the executable instructions comprised in program code 424.

In some illustrative examples, program code 424 may be downloaded over a network to data storage 410 from another device or computer system for use within device 400. Program code 424 comprising computer-executable instructions may be communicated or transferred to device 400 from computer-readable medium 422 through a hard-line or wireless communications link to communications unit 412 and/or through a connection to input/output unit 414. Computer-readable medium 422 comprising program code 424 may be located at a separate or remote location from device 400, and may be located anywhere, including at any remote geographical location anywhere in the world, and may relay program code 424 to device 400 over any type of one or more communication links, such as the Internet and/or other packet data networks. The program code 424 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 424 may be transmitted from a source computer-readable medium 422 over non-tangible media, such as communications links or wireless transmissions containing the program code 424. Program code 424 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to device 400.

As described above, in some examples, SIoT network 104 is a cloud computing system. It is to be understood that although this disclosure includes a detailed description on cloud computing, implementation of the teachings recited herein are not limited to a cloud computing environment. Rather, example techniques described in this disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows. In examples of on-demand self-service, a cloud consumer can unilaterally provision computing capabilities, such as server time and network storage, as needed automatically without requiring human interaction with the service's provider. In examples of road network access, capabilities are available over a network and accessed through standard mechanisms that promote use by heterogeneous thin or thick client platforms (e.g., mobile phones, laptops, and PDAs).

In examples of resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

In examples of rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

In examples of a measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows. In examples of Software as a Service (SaaS), the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

In examples of Platform as a Service (PaaS), the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

In examples of Infrastructure as a Service (IaaS), the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows. In examples of a private cloud, the cloud infrastructure is operated solely for an organization. It may be managed by the organization or a third party and may exist on-premises or off-premises.

In examples of a community cloud, the cloud infrastructure is shared by several organizations and supports a specific community that has shared concerns (e.g., mission, security requirements, policy, and compliance considerations). It may be managed by the organizations or a third party and may exist on-premises or off-premises.

In examples of a public cloud, the cloud infrastructure is made available to the general public or a large industry group and is owned by an organization selling cloud services.

In examples of a hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 5:
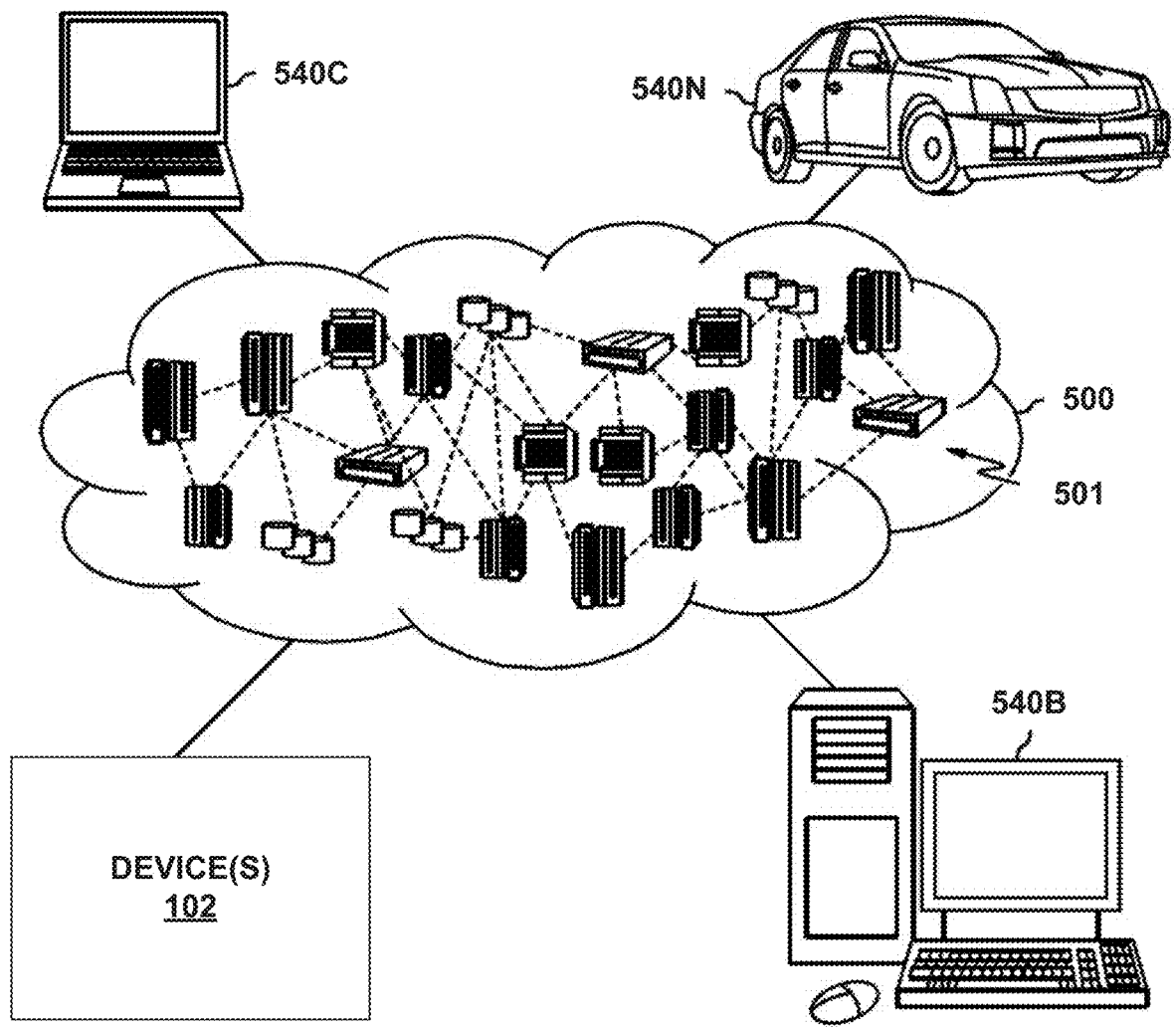
FIG. 5 depicts a cloud computing environment according to some examples of this disclosure.

Referring now to FIG. 5, illustrative cloud computing environment 500 is depicted. Cloud computing environment may be an example of SIoT network 104 (FIG. 1). As shown, cloud computing environment 500 includes one or more cloud computing nodes 501 with which local computing devices used by cloud consumers, such as devices 102 (FIG. 1), and possibly desktop computer 540B, laptop computer 540C, and/or automobile computer system 540N, may communicate. Nodes 501 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of devices 102 and computing devices 540B-N shown in FIG. 5 are intended to be illustrative only and that computing nodes 501 and cloud computing environment 500 can communicate with any type of computerized device over any type of network and/or network addressable connection (e.g., using a web browser).

Figure 6:
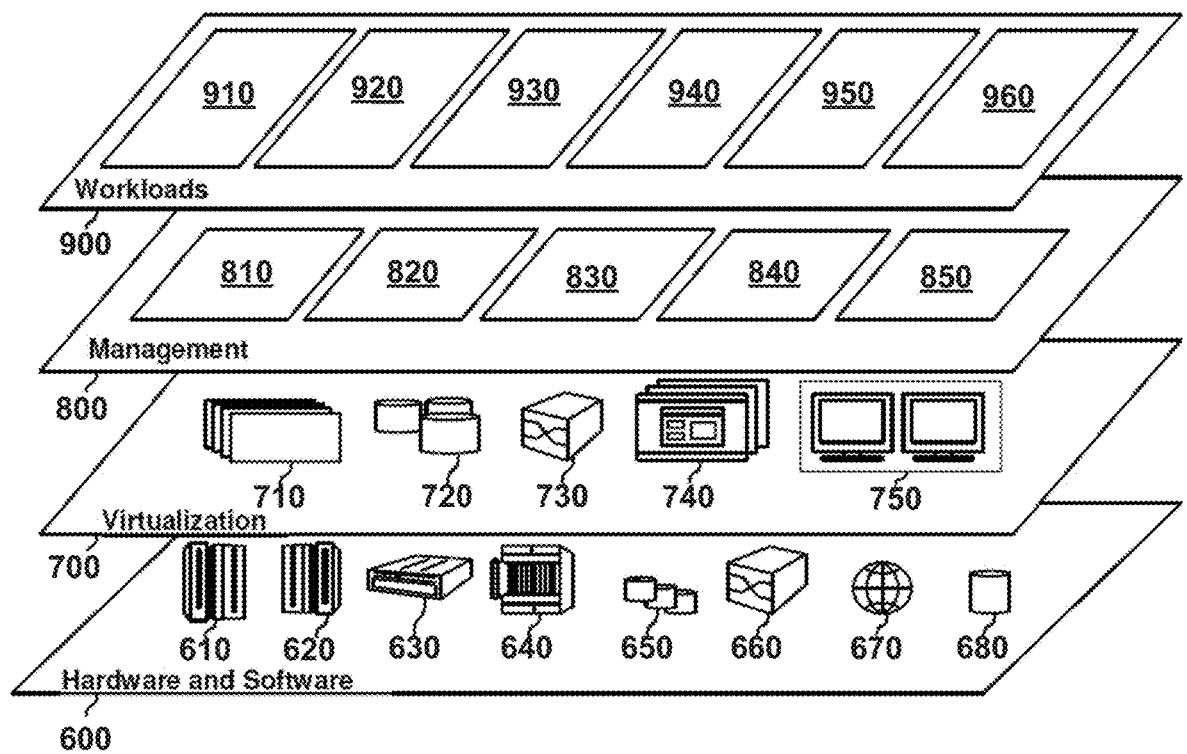
FIG. 6 depicts abstraction model layers according to some examples of this disclosure.

Referring now to FIG. 6, a set of functional abstraction layers provided by cloud computing environment 500 (FIG. 5) is shown. It should be understood in advance that the components, layers, and functions shown in FIG. 6 are intended to be illustrative only and the examples described in this disclosure are not limited thereto. As depicted, the following layers and corresponding functions are provided.

Hardware and software layer 600 includes hardware and software components. Examples of hardware components include mainframes 610, RISC (Reduced Instruction Set Computer) architecture-based servers 620, servers 630, blade servers 640, storage devices 650, and networks and networking components 660. In some embodiments, software components include network application server software 670 and database software 680.

Virtualization layer 700 provides an abstraction layer from which the following examples of virtual entities may be provided: virtual servers 710, virtual storage 720, virtual networks 730, including virtual private networks, virtual applications and operating systems 740, and virtual clients 750.

In one example, management layer 800 may provide the functions described below. Resource provisioning 810 provides dynamic procurement of computing resources and other resources that are utilized to perform tasks within the cloud computing environment. Metering and Pricing 820 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 830 provides access to the cloud computing environment for consumers and system administrators. Service level management 840 provides cloud computing resource allocation and management such that required service levels are met. Service Level Agreement (SLA) planning and fulfillment 850 provide pre-arrangement for, and procurement of, cloud computing resources for which a future requirement is anticipated in accordance with an SLA.

Workloads layer 900 provides examples of functionality for which the cloud computing environment may be utilized. Examples of workloads and functions which may be provided from this layer include mapping and navigation 910, software development and lifecycle management 920, virtual classroom education delivery 930, data analytics processing 940, transaction processing 950, and processing 960. Processing 960 may include IoT feed analyzer 118 and alert generator 120, as well as other components of SIoT network 104 used to perform one or more examples described in this disclosure.

The example techniques described in this disclosure may be a computing device, a method, and/or a computer program product. The computer program product may include a computer readable storage medium (or media) having computer readable program instructions thereon for causing a processor to carry out aspects of one or more examples described in this disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (e.g., network 114), for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of one or more examples described in this disclosure.

Aspects of the disclosure are described herein with reference to flowchart illustrations and/or block diagrams of methods, apparatus (systems), and computer program products according to one or more examples. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various examples of this disclosure. In this regard, each block in the flowchart or block diagrams may represent a module, segment, or portion of instructions, which comprises one or more executable instructions for implementing the specified logical function(s). In some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of the present disclosure has been presented for purposes of illustration and description and is not intended to be exhaustive or limited to the disclosure in the form disclosed. Many modifications and variations will be understood by persons of ordinary skill in the art based on the concepts disclosed herein. The particular examples described were chosen and disclosed in order to explain the techniques described in the disclosure and example practical applications, and to enable others of ordinary skill in the art to understand the disclosure for various examples with various modifications as are suited to the particular use contemplated. The various examples described herein are within the scope of the following claims.

What is claimed is:

1. A method for generating device recommendations, the method comprising: registering a plurality of Internet of Things (IoT) devices in a social IoT network, wherein each device performs one or more tasks, wherein the one or more tasks include a first task; periodically receiving, with the social IoT network, a work profile from one or more of the registered devices, wherein the work profile received from one or more of the registered devices includes device information associated with the one or more device tasks performed by the respective registered device; grouping devices performing the first task into groups of similar devices; identifying, based on the device information in the work profile received from one or more of the registered devices, at least one device from the group of devices for which recommendations are to be provided; generating the recommendations for the identified device; and providing the recommendations for the identified device.

2. The method of claim 1, wherein providing the recommendations includes providing a replace recommendation.

3. The method of claim 1, wherein providing recommendations includes consulting a user profile associated with the owner of the respective device to determine whether replacement is warranted and, if warranted, providing a replace recommendation.

4. The method of claim 1, wherein providing the recommendations includes providing a configuration recommendation.

5. The method of claim 1, wherein providing the recommendations includes determining environmental changes appropriate for the identified device and providing an environmental recommendation.

6. The method of claim 1, wherein identifying the at least one device for which recommendations are to be provided includes: determining a threshold level of performance for the first task for each group of similar devices; and selecting as the identified device and based on the device information in the work profile posted by each registered device, the at least one device that is performing the first task at or below the threshold level of performance for their group.

7. The method of claim 6, wherein providing the recommendations includes providing one or more of a replace recommendation, a configuration recommendation and an environmental recommendation.

8. The method of claim 1, further comprising: determining a threshold level of performance for the first task for each group of similar devices; and selecting, based on the device information in the work profile posted by each registered device, a device from one or more devices in the group performing at or above the threshold level of performance for the group, wherein providing the recommendations includes providing configuration recommendations based on the configuration information of the selected device.

9. The method of claim 1, wherein identifying the at least one device for which recommendations are to be provided includes; determining, based on the device information in the work profile posted by each registered device, whether a different device would better meet the device owner's needs; and wherein providing recommendations includes providing a replace recommendation identifying one or more devices that better meet the device owner's needs.

10. The method of claim 1, wherein the device information includes one or more of a device identifier, a device model identifier, a device type, an owner identifier and a manufacturer identifier.

11. The method of claim 1, wherein the device information includes usage information.

12. The method of claim 11, wherein the usage information includes one or more of date information, device status information, and resource consumption.

13. The method of claim 12, wherein the resource consumption usage information includes one or more of electricity consumption and consumables consumption.

14. The method of claim 1, wherein the device information includes one or more of device size and device environmental conditions.

15. A system, comprising: a social Internet of Things (IoT) network configure to register a plurality of IoT devices connected as, wherein each device performs one or more tasks, wherein the one or more tasks include a first task; an IoT feed analyzer; and an alert generator, wherein the JoT feed analyzer is configured to receive a work profile periodically from one or more of the registered devices, wherein the work profile received from one or more of the registered devices includes device information associated with the one or more device tasks performed by the respective registered devices, wherein the JoT feed analyzer is configured to group devices performing the first task into groups of similar devices, identify, based on the device information in the work profile received from one or more of the registered devices, at least one device from the group of devices for which recommendations are to be provided, and generate the recommendations for the identified device, and wherein the alert generator is configured to transmit the recommendations for the identified device.

16. The system of claim 15, wherein the recommendations include one or more of a replace recommendation, a configuration recommendation and an environmental recommendation.

17. The system of claim 15, wherein the JoT feed analyzer identifies the at least one device for which recommendations are to be provided by: determining a threshold level of performance for the first task for each group of similar devices; and selecting as the identified device and based on the device information in the work profile posted by each registered device, the at least one device performing the first task at below the threshold level of performance for their group.

18. The system of claim 15, the IoT feed analyzer is further configured to: determine a threshold level of performance for the first task for each group of similar devices; and select, based on the device information in the work profile posted by each registered device, a device from one or more devices in the group performing at above the threshold level of performance for the group, wherein the IoT feed analyzer provides the recommendations as configuration recommendations based on the configuration information of the selected devices.

19. The system of claim 15, wherein the device information includes one or more of a device identifier, a device model identifier, a device type, an owner identifier and a manufacturer identifier.

20. A computer-readable storage medium having instructions stored thereon, wherein the instructions, when executed by one or more processors cause the one or more processors to: register a plurality of Internet of Things (JoT) devices in a social JoT network, wherein each device performs one or more tasks, wherein the one or more tasks include a first task; periodically receive a work profile from one or more of the registered devices, wherein the work profile received from one or more of the registered devices includes device information associated with the one or more device tasks performed by the respective registered device; group devices performing the first task into groups of similar devices; identify, based on the device information in the work profile received from one or more of the registered devices, at least one device from the group of devices for which recommendations are to be provided; generate the recommendations for the identified device; and provide the recommendations for the identified device.

* * * * *